US011957173B2

(12) United States Patent
Mazur et al.

(10) Patent No.: US 11,957,173 B2
(45) Date of Patent: Apr. 16, 2024

(54) HEATER ASSEMBLY WITH ANCHORING LEGS

(71) Applicant: PHILIP MORRIS PRODUCTS S.A., Neuchatel (CH)

(72) Inventors: Benjamin Luke Mazur, Bristol (GB); Charley Ann Millard, Bristol (GB); Angelo D'Onofrio, Newport (GB)

(73) Assignee: Philip Morris Products S.A., Neuchatel (CH)

( * ) Notice: Subject to any disclaimer, the term of this patent is extended or adjusted under 35 U.S.C. 154(b) by 660 days.

(21) Appl. No.: 17/269,610

(22) PCT Filed: Aug. 13, 2019

(86) PCT No.: PCT/EP2019/071738
§ 371 (c)(1),
(2) Date: Feb. 19, 2021

(87) PCT Pub. No.: WO2020/038780
PCT Pub. Date: Feb. 27, 2020

(65) Prior Publication Data

US 2021/0337868 A1 Nov. 4, 2021

(30) Foreign Application Priority Data

Aug. 22, 2018 (EP) .................................... 18190179

(51) Int. Cl.
*A24F 47/00* (2020.01)
*A24F 40/20* (2020.01)
(Continued)

(52) U.S. Cl.
CPC .............. *A24F 40/46* (2020.01); *A24F 40/20* (2020.01); *A24F 40/70* (2020.01); *H05B 3/42* (2013.01)

(58) Field of Classification Search
CPC ................................ A24F 40/48; A24F 40/70
See application file for complete search history.

(56) References Cited

U.S. PATENT DOCUMENTS 5,388,594 A * 2/1995 Counts ................. A24F 40/485 131/194
5,865,185 A 2/1999 Colllins
(Continued)

FOREIGN PATENT DOCUMENTS

CA 2144431 3/1994
CA 2218595 3/2005
(Continued)

OTHER PUBLICATIONS

Office Action issued in Korea for Application No. 10-2021-7002364 dated Jan. 20, 2023 (4 pages). English translation included.
(Continued)

*Primary Examiner* — Neil Abrams
(74) *Attorney, Agent, or Firm* — Mueting Raasch Group

(57) ABSTRACT

The invention relates to a heater assembly for generating an inhalable aerosol. The heater assembly comprises an electrically insulating element and an electrical resistive heater. The heater comprises a central heating portion, which is configured to be heated. The heater further comprises electrical contacts, which contact the central heating portion and which are configured to supply electrical energy to the central heating portion. The heater further comprises anchoring legs, which are configured bendable. The anchoring legs are arranged adjacent to the central heating portion and configured to mechanically anchor the electrical resistive heater to the electrically insulating element. The anchoring legs are configured forming a chamfer for guiding insertion of an aerosol-generating article.

15 Claims, 4 Drawing Sheets

Figure 1:
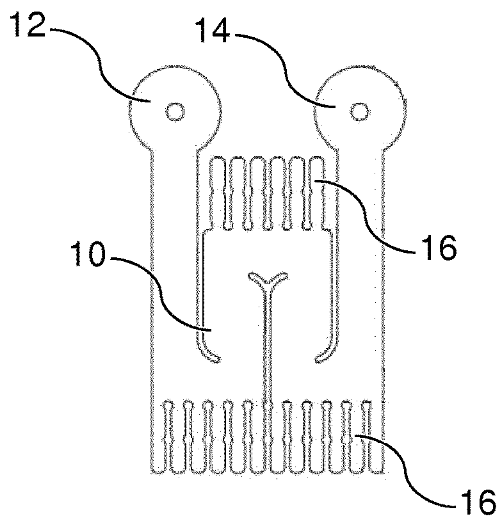
Figure 1:
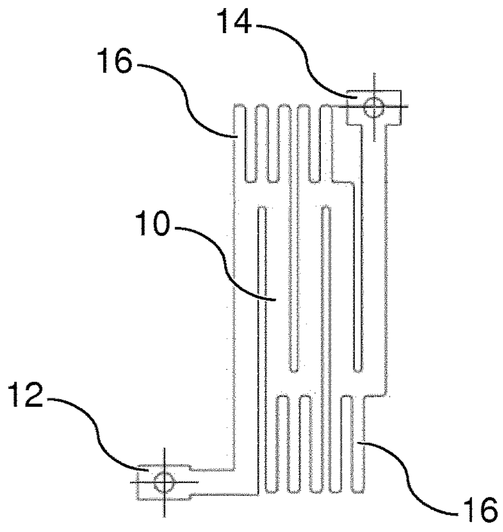

(51) Int. Cl.

| | |
|---|---|
| ***A24F 40/46*** | (2020.01) |
| ***A24F 40/70*** | (2020.01) |
| ***H05B 3/42*** | (2006.01) |

(56) References Cited

U.S. PATENT DOCUMENTS

| | | | | |
|---|---|---|---|---|
| 5,878,752 | A * | 3/1999 | Adams | A24F 40/465 131/194 |
| 7,810,505 | B2 * | 10/2010 | Yang | A24F 40/53 131/194 |
| 9,930,915 | B2 | 4/2018 | Worm | |
| 2014/0283857 | A1 | 9/2014 | Liu | |
| 2021/0337868 | A1 * | 11/2021 | Mazur | A24F 40/20 |

FOREIGN PATENT DOCUMENTS

| | | |
|---|---|---|
| EP | 0503767 | 9/1992 |
| EP | 2327318 | 6/2011 |
| EP | 3257386 | 12/2017 |
| JP | H07-18462 | 1/1995 |
| KR | 1020120104533 | 9/2012 |
| RU | 2604313 | 12/2016 |
| TJ | 343 C | 10/2002 |
| UZ | 2238 C | 12/2002 |
| WO | WO 94/06314 | 3/1994 |
| WO | WO 95/27412 | 10/1995 |

OTHER PUBLICATIONS

Office Action issued in Russia for Application No. 2021103008/03, dated Aug. 10, 2021 (8 pages).

Office Action issued in Japan for Application No. 2021-505712 dated Mar. 22, 2022 (2 pages). English translation included.

Search Report and Written Opinion for PCT/EP2019/071738 dated Oct. 15, 2019 (14 pages).

International Preliminary Examination Report on Patentability for PCT/EP2019/071738 dated Aug. 3, 2020 (7 pages).

* cited by examiner

HEATER ASSEMBLY WITH ANCHORING LEGS

This application is a U.S. National Stage Application of International Application No. PCT/EP2019/071738 filed Aug. 13, 2019, which was published in English on Feb. 27, 2020 as International Publication No. WO 2020/038780 A1. International Application No. PCT/EP2019/071738 claims priority to European Application No. 18190179.4 filed Aug. 22, 2018.

The present invention relates to a heater assembly for an aerosol-generating device for generating an inhalable aerosol.

Aerosol-generating devices are known which are configured to heat aerosol-forming substrate contained in an aerosol-generating article. The article is inserted into a heating chamber, in which an electrical resistive heater is arranged. The heater heats the aerosol-forming substrate to volatilize the substrate. Volatilized substrate is entrained in an air flow through an airflow channel of the device and the generated aerosol is delivered to a user.

The conventional electrical resistive heater may be provided as an external heater surrounding the aerosol-generating article being inserted into the heating chamber of the device.

It would be desirable to have a heater assembly with an electrical resistive heater which is easy to manufacture, which uniformly heats aerosol-forming substrate and which is well insulated from further components of the device.

According to a first aspect of the invention there is provided a heater assembly for generating an inhalable aerosol. The heater assembly comprises an electrically insulating element and an electrical resistive heater. The heater comprises a central heating portion, which is configured to be heated. The heater further comprises electrical contacts, which contact the central heating portion and which are configured to supply electrical energy to the central heating portion. The heater further comprises anchoring legs, which are configured bendable. The anchoring legs are arranged adjacent to the central heating portion and configured to mechanically anchor or mount the electrical resistive heater to the electrically insulating element.

The electrical resistive heater will in the following also be referred to as ‘heater’. The heater according to the invention comprises the central heating portion for heating purposes. The central heating portion may be arranged in the aerosol-generating device in or adjacent a heating chamber of the aerosol-generating device. In the heating chamber, an aerosol-generating article containing aerosol-forming substrate may be inserted. The aerosol-generating device together with the aerosol-generating article is referred to as aerosol-generating system.

The central heating portion may be arranged such that primarily the aerosol-forming substrate of an inserted aerosol-generating article is heated. The central heating portion may for this purpose be connected to the electrical contacts. The electrical contacts may supply electrical current to the central heating portion. The current runs through the central heating portion thereby heating the central heating portion.

Also part of the heater are anchoring legs. In conventional heaters, the heater must be fixed to the aerosol-generating device, which may incur complex solutions and relative high costs. In the present invention, the heater itself provides elements for anchoring the heater. These elements are the anchoring legs. The anchoring legs may extend from the central heating portion. The anchoring of the anchoring legs may be realized by anchoring the legs at least partly to the electrically insulating element.

The heater assembly of the present invention achieves optimized heating of the aerosol-generating article as well as good thermal insulation so that the heating of the article is efficient and power consumption is decreased, allowing several sessions without the need of recharging.

The central heating portion and the anchoring legs may be integrally formed. Ease of manufacture may thus be achieved, while providing a central heating portion for heating and anchoring legs for anchoring the heater.

The central heating portion and the anchoring legs may be configured as an integral metal sheet. The metal sheet comprising the central heating portion as well as the anchoring legs may be made using mass production technologies like etching, laser cutting or stamping. The heater may thus be simple and cheap to manufacture as mass production processes can be used.

The integral metal sheet may have a thickness of between 50 μm and 200 μm, preferably 75 μm and 150 μm, and more preferably around 100 μm. Due to the thickness of the heater, the heater may have a low thermal inertia and may thus quickly reach its efficient heating temperature. The central heating portion may have a heating surface of between 50 mm×40 mm, preferably between 35 mm×25 mm, more preferably between 20 mm×15 mm.

The heater may be thus be made of an optimized low volume of a sheet of one single material. The central heating portion and the anchoring legs may comprise, preferably consist, of stainless steel or titanium, preferably stainless steel 304. Such materials are not toxic, do not need relevant maintenance, and are resistant to heat and corrosive gas that could be generated in aerosol-generating devices.

The central heating portion may have a tubular shape. The assembly of the heater may require only bending of the initial sheet.

The heater may be configured as an external heater positioned around a perimeter of the heating chamber. The external heater may take any suitable form. Instead of a bend metal sheet, for example, the external heater may take the form of one or more flexible heating foils on a dielectric substrate, such as polyimide. The flexible heating foils may be shaped to conform to the perimeter of the heating chamber. Alternatively, the external heater may take the form of a metallic grid or grids, a flexible printed circuit board, a moulded interconnect device (MID), ceramic heater, flexible carbon fibre heater or may be formed using a coating technique, such as plasma vapour deposition, on a suitable shaped substrate. The external heater may also be formed using a metal having a defined relationship between temperature and resistivity. In such an exemplary device, the metal may be formed as a track between two layers of suitable insulating materials. An external heater formed in this manner may be used to both heat and monitor the temperature of the external heater during operation. Preferably, however, the external heater of the present invention is made from a single metal sheet which is bent to have a tubular shape enabling external heating.

The air pressure due to external heating of the aerosol-generating article may push the generated aerosol to flow towards the inside of the aerosol-generating article. Inside of the aerosol-generating article, efficient air paths going to a user’s mouth are typically present. Furthermore, external heating, because addressing more surface of the aerosol-generating article than internal heating, may help avoiding the risk of overheating the aerosol-generating article while increasing homogeneous heating the substrate contained in the aerosol-generating article.

The anchoring legs may comprise proximal anchoring legs and distal anchoring legs, wherein the proximal anchoring legs may be arranged adjacent to a proximal end of the central heating portion, wherein the distal anchoring legs may be arranged adjacent to a distal end of the central heating portion opposite the proximal end of the central heating portion. The proximal anchoring legs may also be denoted as top anchoring legs and are provided downstream of the distal anchoring legs, which may also be denoted as upstream anchoring legs.

As used herein, the terms 'upstream', 'downstream', 'proximal', 'distal', are used to describe the relative positions of components, or portions of components, of the aerosol-generating system in relation to the direction in which a user draws on the aerosol-generating system during use thereof.

The aerosol-generating system may comprise a mouth end through which in use an aerosol exits the aerosol-generating system and is delivered to a user. The mouth end may be a proximal end of an aerosol-generated article inserted into the heating chamber of the aerosol-generating device. The mouth end may thus also be referred to as the proximal end. In use, a user draws on the proximal or mouth end of the aerosol-generating system in order to inhale an aerosol generated by the aerosol-generating system. The aerosol-generating system comprises a distal end opposite the proximal or mouth end. The proximal or mouth end of the aerosol-generating system may also be referred to as the downstream end and the distal end of the aerosol-generating system may also be referred to as the upstream end. Components, or portions of components, of the aerosol-generating system may be described as being upstream or downstream of one another based on their relative positions between the proximal, downstream or mouth end and the distal or upstream end of the aerosol-generating system.

The tubular heater is preferably arranged parallel to the central longitudinal axis of the aerosol-generating device, which extends from the proximal end to the distal end or vice versa. This axis is preferably identical to the central longitudinal axis of the electrical resistive heater.

The anchoring legs may have a longitudinal shape and may extend at least partially parallel to the central longitudinal axis of the electrical resistive heater. The proximal anchoring legs may extend from the proximal end of the central heating portion in a proximal or downstream direction. The distal anchoring legs may extend from the distal end of the central heating portion in a distal or upstream direction.

The electrically insulating element may have a tubular shape. The anchoring legs may be arranged bend away from the central longitudinal axis of the electrical resistive heater. The anchoring legs may be configured to bend around and hook to at least a tubular opening of the electrically insulating element. Preferably, the proximal anchoring legs are configured being hooked to the proximal end, i.e. the proximal tubular opening, of the electrically insulating element. Preferably, the distal anchoring legs are configured being hooked to the distal end, i.e. the distal tubular opening, of the electrically insulating element.

The anchoring legs may be bent so as to hook to the outside of the tubular electrically insulating element inside of which the central heating portion of the heater is then arranged. The heater as well as the electrically insulating element may thus have a tubular shape, wherein the mechanical connection between the tubular electrically insulating element and the tubular central heating portion is realized by the outwardly bent anchoring legs. The term 'tubular' regarding the heater is thus to be understood as the central heating portion of the heater having a tubular shape. The anchoring legs may bend outwards to hook the tubular electrically insulating element, while this configuration is still encompassed by the term of a 'tubular shaped heater'.

Because the legs, which are arranged outside of the tubular electrically insulating element, are not heated to a relevant degree, the electrically insulating element acts as a thermal insulating tube for thermally insulating the central heating portion relative to the further components of the aerosol-generating device.

The proximal tubular opening of the electrically insulating element may be arranged adjacent to the proximal end of the central heating portion. The distal tubular opening of the electrically insulating element may be arranged opposite the proximal tubular opening of the electrically insulating element and adjacent to the distal end of the central heating portion. In other words, the tubular electrically insulating element may essentially cover the tubular central heating portion, while the anchoring legs extend over the tubular electrically insulating element so that the anchoring legs can be bent around the openings of the tubular electrically insulating element to securely anchor the tubular heater to the tubular electrically insulating element.

The anchoring legs may extend from the proximal and the distal ends of the central heating portion. The anchoring legs may not be provided on side portions of the central heating portion, which run along the longitudinal axis of the aerosol-generating device. The anchoring legs may be configured to prevent unwanted displacement of the heater along the longitudinal axis of the aerosol-generating device during insertion and removal of an aerosol-generating article.

The anchoring legs may be indirectly connected to the electrical contacts. In other words, the anchoring legs may be electrically connected to the central heating portion, but not part of a conductive path which runs from a first electrical contact through the central heating portion towards a second electrical contact. The anchoring legs may thus be configured in an 'open circuit', i.e. the heating current used in the central heating portion for resistance heating does not run into them, and so the anchoring legs are not heated by resistance heating as it is the case for the central heating portion.

Heat may then only travel into the anchoring legs by conductive heating which will provide low heating energy in comparison to the heat provided in the central heating portion by resistance heating. The heat in the anchoring legs will furthermore decrease along the anchoring legs length, so the ends of the anchoring legs will be much colder than the central heating portion. The anchoring legs may thus be used for anchoring the heater without significant heat loss and without unwanted heating of other components of the aerosol-generating device.

The electrically insulating element may be made from electrically insulating material, preferably made from polyether ether ketone (PEEK), and preferably may be made from thermally insulating material. The insulating tube may thus be made from a thermal and electrical insulating material, like PEEK for instance, e.g. a material that is thermostable and both electrically and thermally insulating. PEEK is a species within the family of polyarylether ketones (PAEK). One or more suitable materials may be utilized, including, but are not limited to, aluminium, polyether ether ketone (PEEK), polyimides, such as Kapton®, polyethylene terephthalate (PET), polyethylene (PE), polypropylene (PP), polystyrene (PS), fluorinated ethylene propylene (FEP), polytetrafluoroethylene (PTFE), epoxy resins, polyurethane resins and vinyl resins. The thermal insulation may protect the other part of the aerosol-generating device, as well as the user, from the heat of the heater. Secure connection between the electrical resistive heater and the electrically insulating element may also lead to prevention of heat hazards due to thermal insulation of the heater.

The electrical insulation facilitates that the anchoring legs used to hook the heater to the electrically insulating element may not be in contact with electrical conductor material to prevent current from running through the anchoring legs and thus to prevent heating of the anchoring legs.

The electrically insulating element may surround the heater so that the heater may be uniformly anchored to the electrically insulating element. At least one, preferably both, of the heater and the electrically insulating element may partly or fully surround the heating chamber of the aerosol-generating device. Preferably, the heater and the electrically insulating element fully surround the heating chamber of the aerosol-generating device.

The electrically insulating element may further comprise a first ring-shaped element and a second ring shaped element, wherein the first ring-shaped element may be configured to mechanically attach the proximal anchoring legs to the proximal tubular opening of the electrically insulating element. The second ring-shaped element may be configured to mechanically attach the distal anchoring legs to the distal tubular opening of the electrically insulating element opposite the proximal tubular opening of the electrically insulating element.

The rings may be provided for securing the hooking connection between the heater and the electrically insulating element. The rings may clamp the anchoring legs to the electrically insulating element. The clamping of the anchoring legs to the electrically insulating element may be done mechanically, for example by a press fit. Thus, glue may not be needed so that the resulting element consisting of the heater, the electrically insulating element and the rings has a strong stability and thus an optimized lifespan, without the risk of having glue losing its gluing property due to the aerosol or heat generated by the heater. Alternatively, glue may be used instead or in addition to the mechanical connection between the heater and the electrically insulating element.

The rings may comprise connection elements to facilitate a secure connection between the rings and the anchoring legs as well as the electrically insulating element. For example, the rings may comprise protruding elements or recesses matching corresponding elements provided on the outer surface of the electrically insulating element. These matching elements may be provided to facilitate a snap fit between the rings and the electrically insulating element, thereby sandwiching and hence securing the anchoring legs between the rings and the electrically insulating element. The connection elements may be provided flexible. Only one ring may be provided on the proximal or distal end of the electrically insulating element if sufficient for securing the heater to the electrically insulating element. Consequently, anchoring legs may only be provided on one end of the central heating region if sufficient for securely holding the heater.

The rings preferably comprise a cavity for enabling through-flow of air and aerosol. The rings may be made from electrically and thermally insulating material such as PEEK.

The anchoring legs may be configured forming a chamfer for guiding an aerosol-generating article during insertion into the heating chamber. Once bent and hooking the electrically insulating element, the legs may thus provide slopes for guiding an aerosol-generating article towards the center of the heater, helping the insertion of an aerosol-generating article by the user. In other words, the anchoring legs form a funnel easing insertion of an aerosol-generating article. Again in other words, the anchoring legs, in the area where the article has to be inserted, are arranged along the hyperbolas of the upper surface of a one-sheet hyperboloid of revolution, so they run from a wide to a narrower tubular part, helping guiding the user to easily insert the article into the center of the heater.

The central heating portion may comprise a non-linear conductive path between the electrical contacts. The central heating portion may comprise a zigzag conductive path between the electrical contacts. The conductive path between the electrical contacts may be optimized for heat generating. The conductive path may run over essentially the whole surface of the central heating portion to facilitate uniform heating. The conductive path may be realized by incisions in the metal sheet of the heater. The incisions may be provided in a direction parallel to the central longitudinal axis of the aerosol-generating device. Instead or additional to incision, recessed may be provided in the central heating portion.

The central heating portion may comprise multiple conductive paths between corresponding pairs of individually controllable electrical contacts. The conductive paths may be provided electrically insulated from each other. Different regions of aerosol-forming substrate may be heated by providing multiple conductive paths. In this regard, the aerosol-generating device may comprise a controller for controlling the heating of the multiple conductive paths. A conductive path may be heated during one puff of a user, thereby depleting an adjacent region of aerosol-forming substrate of an inserted aerosol-generating article.

The controller may be a simple switch. Alternatively the controller may be electric circuitry and may comprise one or more microprocessors or microcontrollers. The microprocessor may be a programmable microprocessor. The controller may comprise further electronic components. The controller may be configured to regulate a supply of power to the heater or to individual conductive paths of the heater. Power may be supplied to the heater continuously following activation of the device or may be supplied intermittently, such as on a puff-by-puff basis. The power may be supplied to the heater in the form of pulses of electrical current. The controller may be configured to monitor the electrical resistance of the heater, and preferably to control the supply of power to the heater dependent on the electrical resistance of the heater. The controller may be configured to progressively heat the aerosol-forming substrate, for example by adjusting the voltage to the electrical contacts of the heater, or the number of electrical paths activated or by using pulse-width modulation (PWM).

The controller may be connected to a puff detection system. Alternatively, the activation may be triggered by pressing an on-off button, held for the duration of the user's puff.

The puff detection system may be provided as a sensor, which may be configured as an airflow sensor and may measure the airflow rate. The airflow rate is a parameter characterizing the amount of air that is drawn through the airflow path of the aerosol-generating device per time by the user. The initiation of the puff may be detected by the airflow sensor when the airflow exceeds a predetermined threshold. Initiation may also be detected upon a user activating a button.

The sensor may also be configured as a pressure sensor to measure the pressure of the air inside the aerosol-generating device which is drawn through the airflow path of the device by the user during a puff. The sensor may be configured to measure a pressure difference or pressure drop between the pressure of ambient air outside of the aerosol-generating device and of the air which is drawn through the device by the user. The pressure of the air may be detected at an air inlet, preferably a semi-open inlet, at a proximal end of the device, at the heating chamber or at any other passage or chamber within the aerosol-generating device, through which the air flows. When the user draws on the aerosol-generating system, a negative pressure or vacuum is created inside the device, wherein the negative pressure may be detected by the pressure sensor. The term 'negative pressure' is to be understood as a relative pressure with respect to the pressure of ambient air. In other words, when the user draws on the system, the air which is drawn through the device has a pressure which is lower than the pressure off ambient air outside of the device. The initiation of the puff may be detected by the pressure sensor if the pressure difference exceeds a predetermined threshold.

The central heating portion may be configured stretchable. This feature may be realized by the recesses or incisions used for creating the non-linear conductive path between the electrical contacts. The central heating portion may utilize the flexibility of the metal material from which the central heating portion is made to enable amending the diameter or circumference of the tubular heater. If desired, the amendable diameter may be used to securely hold an inserted aerosol-generating article in the heating chamber by a friction fit between the central heating portion of the heater and the inserted aerosol-generating article. Generally, at least the central heating portion may facilitate an efficient confinement for an aerosol-generating article.

The central heating portion of the heater may have a diameter corresponding to the diameter of an inserted aerosol-generating article so that the article is securely held in the heating chamber. The stretchability of the central heating portion may be utilized to increase the retention force acting upon an inserted aerosol-generating article. In this regard, the diameter of an article may be slightly larger than the diameter of the tubular central heating portion of the heater. During insertion of the aerosol-generating article, the central heating portion may be slightly expanded thereby holding the article in a friction fit. The fit ensures contact between the article and the heater. The fit provides some resistance against movement of the corresponding article along the longitudinal axis of the aerosol-generating device. An air gap between article and heater may cause thermal losses, reducing efficiency of heating of an article. Generated aerosol may be lost via an air gap. An air gap may adversely affect resistance to draw (RTD) of the system. Advantageously, proximity or contact between an article and the heater reduces or eliminates an air gap, increasing thermal contact, which reduces thermal losses and chances of losing aerosol through the air gap and RTD is maintained within a desirable range.

The central heating portion may comprise opposing end portions, wherein the opposing end portions may be connectable so that the central heating portion may have a tubular shape. The opposing end portions preferably are side portion connecting the proximal end of the central heating portion with the distal end of the central heating portion.

The central heating portion may comprise a conductive path having a V-shape, which may be configured to penetrate aerosol-forming substrate contained in an aerosol-generating article during insertion of the aerosol-generating article into the heating chamber of the aerosol-generating device.

This additional portion of the central heating portion may be provided with an additional conductive path independent of the initial conductive path of the central heating portion. The conductive path of the V-shaped additional portion of the central heating portion may also be part of a single conductive path of the central heating portion. The V-shaped additional portion is preferably provided as an internal heater, while the rest of the central heating portion surrounds an inserted aerosol-generating article thus constituting an external heater. The V-shaped additional portion may optimize uniform heating of the aerosol-forming substrate contained in the aerosol-generating article due to the fact that the aerosol-forming substrate is heated from the inside as well as from the outside according to this aspect.

The aerosol-generating device may comprise a power supply for supplying power to the heater. The power supply may be controlled by the controller. The power supply may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user's lungs thorough the user's mouth. An aerosol-generating device may be a holder. Apart from the heater assembly itself, the present invention is also directed to an aerosol-generating device comprising a heater assembly as described above.

The device is preferably a portable or handheld device that is comfortable to hold between the fingers of a single hand. The device may be substantially cylindrical in shape and has a length of between 70 and 120 mm. The maximum diameter of the device is preferably between 10 and 20 mm. In one embodiment the device has a polygonal cross section and has a protruding button formed on one face. In this embodiment, the diameter of the device is between 12.7 and 13.65 mm taken from a flat face to an opposing flat face; between 13.4 and 14.2 mm taken from an edge to an opposing edge (i.e., from the intersection of two faces on one side of the device to a corresponding intersection on the other side), and between 14.2 and 15 mm taken from a top of the button to an opposing bottom flat face. The device may be an electrically heated smoking device.

In another aspect of the invention, there is provided an aerosol-generating system comprising an aerosol-generating device with a heater assembly as described herein and one or more aerosol-generating articles configured to be received in the heating chamber of the aerosol-generating device. During operation, an aerosol-generating article containing the aerosol-forming substrate may be partially contained within the aerosol-generating device.

The aerosol-generating system is a combination of an aerosol-generating device and one or more aerosol-generating articles for use with the device. However, the aerosol-generating system may include additional components, such as for example a charging unit for recharging an on-board electric power supply in an electrically operated or electric aerosol-generating device.

As used herein, the term 'aerosol-generating article' refers to an article comprising an aerosol-forming substrate that is capable of releasing volatile compounds that can form an aerosol. For example, an aerosol-generating article may be a smoking article that generates an aerosol that is directly inhalable into a user's lung through the user's mouth. An aerosol-generating article may be disposable. A smoking article comprising an aerosol-forming substrate comprising tobacco is referred to as a tobacco stick.

The aerosol-generating article may be substantially cylindrical in shape. The aerosol-generating article may be substantially elongate. The aerosol-generating article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-generating article may have a total length between approximately 30 mm and approximately 100 mm. The aerosol-generating article may have an external diameter between approximately 5 mm and approximately 12 mm. Preferably, the aerosol-generating article has a diameter of between 5 mm and 8 mm. More preferably, the aerosol-generating article has a diameter of around 5.4 mm or 7.8 mm. The aerosol-generating article may comprise a filter plug. The filter plug may be located at a downstream end of the aerosol-generating article. The filter plug may be a cellulose acetate filter plug. The filter plug is approximately 7 mm in length in one embodiment, but may have a length of between approximately 5 mm to approximately 10 mm.

In one embodiment, the aerosol-generating article has a total length of approximately 45 mm. The aerosol-generating article may have an external diameter of approximately 7.2 mm. Further, the aerosol-forming substrate may have a length of approximately 10 mm. Alternatively, the aerosol-forming substrate may have a length of approximately 12 mm. Further, the diameter of the aerosol-forming substrate may be between approximately 5 mm and approximately 12 mm. The aerosol-generating article may comprise an outer paper wrapper. Further, the aerosol-generating article may comprise a separation between the aerosol-forming substrate and the filter plug. The separation may be approximately 18 mm, but may be in the range of approximately 5 mm to approximately 25 mm.

As used herein, the term 'aerosol-forming substrate' relates to a substrate capable of releasing volatile compounds that can form an aerosol. Such volatile compounds may be released by heating the aerosol-forming substrate. An aerosol-forming substrate may conveniently be part of an aerosol-generating article or smoking article.

The aerosol-forming substrate may be a solid aerosol-forming substrate. Alternatively, the aerosol-forming substrate may comprise both solid and liquid components. The aerosol-forming substrate may be provided in the form of a gel. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former that facilitates the formation of a dense and stable aerosol. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise combining one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

In a particularly preferred embodiment, the aerosol-forming substrate comprises a gathered crimpled sheet of homogenised tobacco material. As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-forming substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled. In certain embodiments, the aerosol-forming substrate may comprise a gathered sheet of homogenised tobacco material that is substantially evenly textured over substantially its entire surface. For example, the aerosol-forming substrate may comprise a gathered crimped sheet of homogenised tobacco material comprising a plurality of substantially parallel ridges or corrugations that are substantially evenly spaced-apart across the width of the sheet.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

The portion of the heater, which is in contact with the aerosol-forming substrate, is heated as a result of the electrical current passing through the heater. The current is supplied by a power supply. This portion of the heater may be configured to reach a temperature of between about 140° C. and about 340° C. in use. Preferably, the heater may be configured to reach a temperature of between about 140° C. and about 250° C. More preferably, the heater may be configured to reach a temperature of between about 140° C. and about 200° C., most preferably of between about 140° C. and about 160° C. A low heater temperature may prevent overheating of the surrounding housing of the device thereby preventing discomfort for a user. Energy may additionally be saved, thereby preserving battery power. Low heater temperatures may additionally reduce or avoid formation of undesired constituents during heating of the aerosol-forming substrate.

The invention further relates to a method for manufacturing a heater assembly, wherein the method comprises the steps of:

i) providing an electrically insulating element,
ii) providing an electrical resistive heater, the heater comprising:
  a central heating portion, which is configured to be heated,
  electrical contacts, which contact the central heating portion and which are configured to supply electrical energy to the central heating portion, and
  anchoring legs, which are configured bendable, wherein the anchoring legs are arranged adjacent to the central heating portion,
iii) adapting the central heating portion so that the central heating portion has a tubular shape,
iv) inserting the central heating portion into the electrically insulating element, and
v) bending the anchoring legs outwards and at least partially around the electrically insulating element to anchor the electrical resistive heater to the electrically insulating element.

Features described in relation to one aspect may equally be applied to other aspects of the invention.

Figure 2:
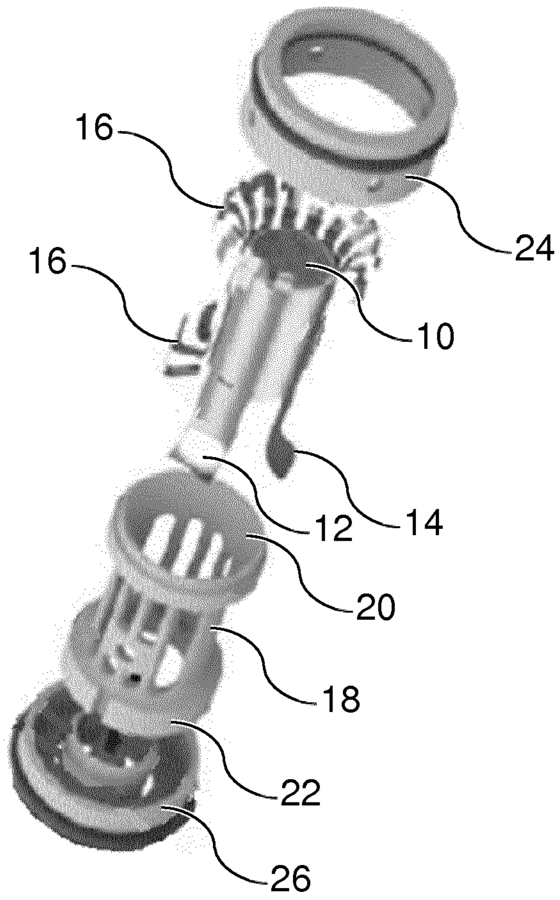
Figure 3:
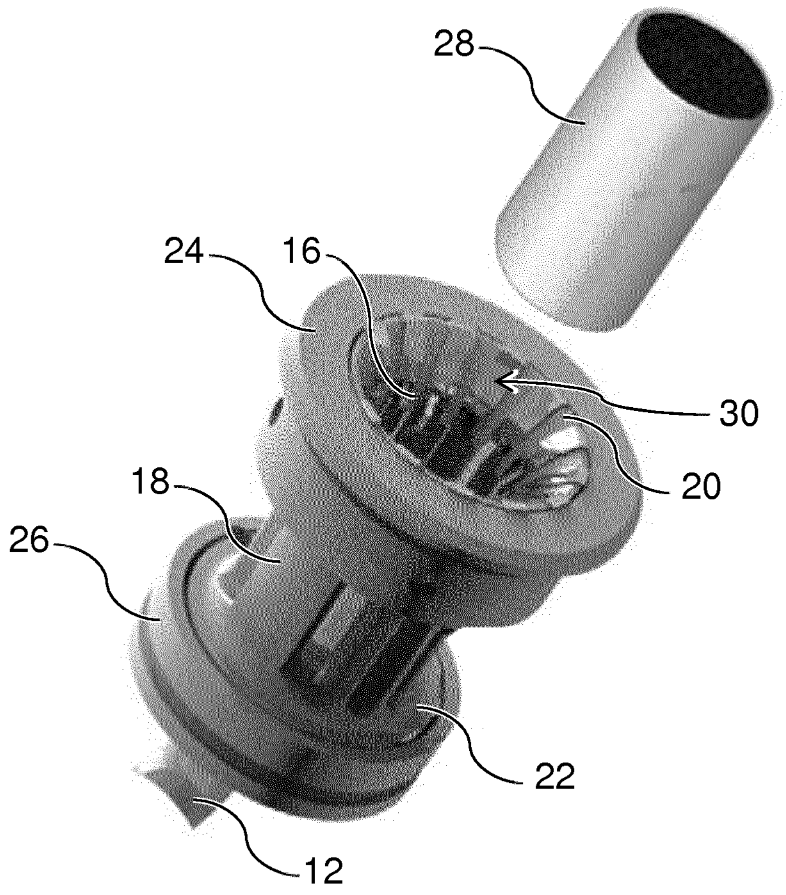
Figure 4:
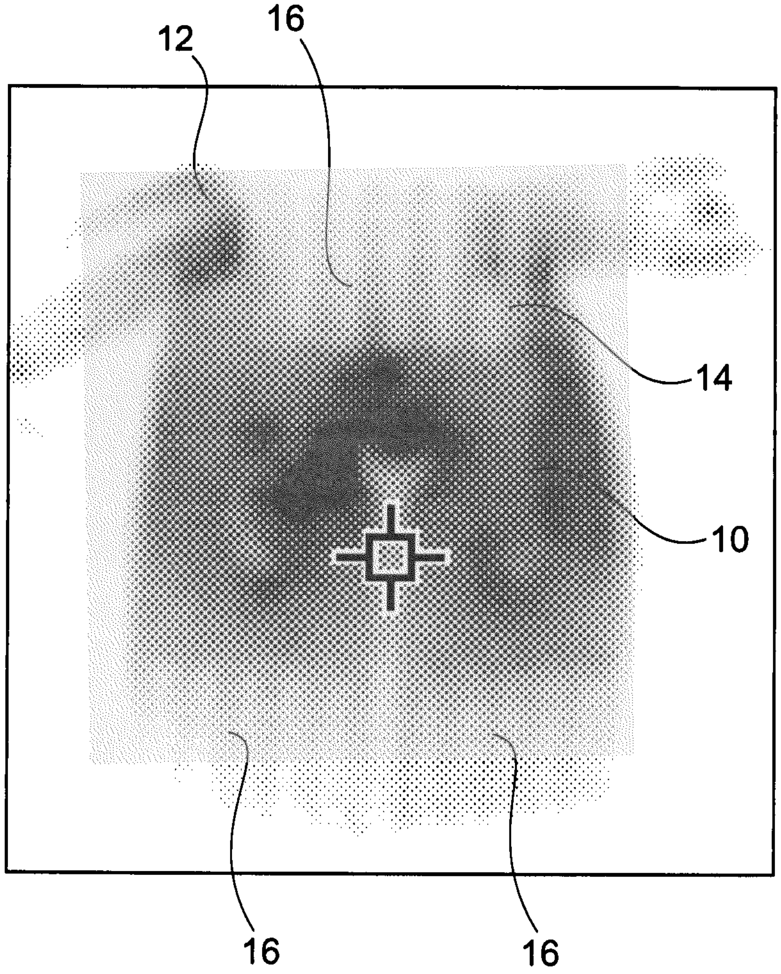

The invention will be further described, by way of example only, with reference to the accompanying drawings in which:

FIG. 1 shows illustrative aspects of a heater assembly of the present invention, FIG. 2 shows an exploded view of the heater assembly together with an electrically insulating element and rings for attachment, FIG. 3 shows the components shown in FIG. 2 assembled together as well as an aerosol-generating article to be inserted, and FIG. 4 shows a heat image of the heater assembly.

FIG. 1 shows two aspects of the electrical resistive heater comprising a central heating portion 10. Electrically connected with the central heating portion 10 are a first electrical contact 12 and a second electrical contact 14. The electrical contacts 12, 14 are provided for supplying electrical energy from a power supply such as a battery towards the heater.

In both aspects shown in FIG. 1, the heater is provided as a flat sheet of metal. As will be described in more detail below, the flat metal sheet is subsequently bent so that the heater then has a tubular shape. In addition to the central heating portion 10 and the electrical contacts 12, 14, the heater comprises anchoring legs 16. The anchoring legs 16 are integrally formed from the same metal sheet as the central heating portion 10. The anchoring legs 16 are provided on opposing ends of the central heating portion 10. The side portions of the central heating portion 10 connecting the opposing ends of the central heating portion 10 are configured to be connected with each other so that the tubular shape of the heater can be realized.

In the left and right aspects of the heater, different configurations for creating a conductive path in the central heating portion 10 are shown. The conductive path preferably is a zigzag path for enabling uniform heating of the central heating portion 10.

FIG. 2 shows further components of the aerosol-generating device. The heater is also depicted in FIG. 2. However, the heater has in FIG. 2 been brought in the tubular shape by bending the metal sheet. The upper part in FIG. 2 is a proximal direction of the device, while the lower part of FIG. 2 is a distal direction of the device. This means that air flows from the lower upstream part towards the upper downstream part. The anchoring legs 16 can in FIG. 2 be seen to be provided at proximal and distal ends of the tubular heater.

Further depicted in FIG. 2 is an electrically resistive element 18 which is made from thermally and electrically insulating material such as PEEK. The electrically resistive element 18 is provided for surrounding the heater and thereby electrically and thermally insulating the heater from further components of the aerosol-generating device. The electrically resistive element 18 also comprises a proximal end 20 and a distal end 22. The anchoring legs 16 are configured to bend outwards and over the ends 20, 22 of the electrically resistive element 18 to anchor the heater to the electrically resistive element 18.

For securely holding the anchoring legs 16 in place, a proximal ring 24 and a distal ring 26 are provided. The rings 24, 26 are configured to clamp the anchoring legs 16 between the rings 24, 26 and the electrically resistive element 18.

FIG. 3 shows the components introduced in FIG. 2 in an assembled state. In this figure, the central heating portion 10 is arranged inside of the electrically resistive element 18. The central heating portion 10 and the electrically resistive element 18 both have a tubular shape and surround a heating chamber of the aerosol-generating device into which a consumable in the form on an aerosol-generating article 28 can be inserted. Due to the central heating portion 10 being arranged on the inside of the electrically resistive element 18, the central heating portion 10 comes into direct contact with the aerosol-generating article 28 so that aerosol-forming substrate contained in the aerosol-generating article 28 can be optimally heated. By surrounding the central heating portion 10 with the thermally insulating electrically resistive element 18, heat is trapped inside of the heating chamber, thereby optimizing energy efficiency of the device.

FIG. 3 also shows that the anchoring legs 16 are bend outwards and around the proximal end 20 and the distal end 22 of the electrically resistive element 18. For securing the anchoring legs 16 in place and thus securing the central heating portion 10 in the desired position inside of the electrically resistive element 18, the rings 24, 26 are shown in FIG. 3 clamping the anchoring legs 16. The whole element consisting of the central heating portion 10, the anchoring legs 16, the electrically resistive element 18 and the rings 24, 26 thus constitutes an element being configured to provide a space into which the aerosol-generating article 28 can be inserted and which is configured for heating the article 28 while being electrically and thermally insulated with respect to the rest of the aerosol-generating device.

Additionally, it is shown in FIG. 3 that the bend anchoring legs 16 constitute a chamfer 30 for facilitating insertion of the aerosol-generating article 28 into the heating chamber of the aerosol-generating device.

FIG. 4 shows a heat image of the heater assembly. It can be seen that the heating predominantly takes place in the central heating portion 10. This is due to the fact that the conductive path runs from the first electrical contact 12 through the central heating portion 10 and towards the second electrical contact 14 (or vice versa). The anchoring legs 16 do not participate in this conductive path and are therefore only passively heated by conduction of heat from the central heating portion 10 to the anchoring legs 16. After bending of the anchoring legs 16 around the end portions 20, 22 of the electrically resistive element 18, the ends of the anchoring legs 16 are negligibly heated. In other words, the ends of the anchoring legs 16 being arranged on the outside of the electrically resistive element 18 in comparison with the rest of the heater assembly, mainly the central heating portion 10, being arranged on the inside of the electrically resistive element 18 do not radiate relevant amounts of heat to the outside of the heating chamber. Hence, a heater is provided from a single sheet of metal material which constitutes not only the heating portion of the heater, i.e. the central heating portion 10, but also the fixation means of the heater, i.e. the anchoring legs 16, while at the same time optimizing electrical and thermal insulation and stability of the heater.

The invention claimed is:

1. A heater assembly for aerosol-generating device for generating an inhalable aerosol, the heater assembly comprising:
- an electrically insulating element, and
- an electrical resistive heater, the heater comprising:
  - a central heating portion, which is configured to be heated,
  - electrical contacts, which contact the central heating portion and which are configured to supply electrical energy to the central heating portion, and
  - anchoring legs, which are configured bendable,
- wherein the anchoring legs are arranged adjacent to the central heating portion and configured to mechanically anchor the electrical resistive heater to the electrically insulating element, and wherein the anchoring legs are configured forming a chamfer for guiding insertion of an aerosol-generating article.

2. The heater assembly according to claim 1, wherein the central heating portion and the anchoring legs are integrally formed.

3. The heater assembly according to claim 1, wherein the central heating portion and the anchoring legs are configured as an integral metal sheet.

4. The heater assembly according to claim 1, wherein the central heating portion has a tubular shape.

5. The heater assembly according to claim 1, wherein the anchoring legs comprise proximal anchoring legs and distal anchoring legs, wherein the proximal anchoring legs are arranged adjacent to and extending from a proximal end of the central heating portion, and wherein the distal anchoring legs are arranged adjacent to and extending from a distal end of the central heating portion opposite the proximal end of the central heating portion.

6. The heater assembly to claim 1, wherein the anchoring legs are arranged bend away from the central longitudinal axis of the electrical resistive heater.

7. The heater assembly according to claim 1, wherein the anchoring legs have a longitudinal shape and preferably extend at least partially parallel to the central longitudinal axis of the electrical resistive heater.

8. The heater assembly according to claim 1, wherein the electrically insulating element has a tubular shape.

9. The heater assembly according to claim 8, wherein the anchoring legs are configured to bend around and hook to at least a proximal tubular opening of the electrically insulating element.

10. The heater assembly according to claim 9, wherein the anchoring legs comprise proximal anchoring legs, wherein the proximal anchoring legs are arranged adjacent to and extending from a proximal end of the central heating portion and are configured to bend around and hook to the proximal tubular opening of the electrically insulating element, the proximal tubular opening of the electrically insulating element being arranged adjacent to the proximal end of the central heating portion, and wherein the anchoring legs comprise distal anchoring legs, wherein the distal anchoring legs are arranged adjacent to and extending from a distal end of the central heating portion opposite the proximal end of the central heating portion and are configured to bend around and hook to a distal tubular opening of the electrically insulating element, the distal tubular opening of the electrically insulating element being arranged opposite the proximal tubular opening of the electrically insulating element and adjacent to the distal end of the central heating portion.

11. The heater assembly according to claim 1, wherein the electrically insulating element further comprises a first ring-shaped element and a second ring shaped element, wherein the first ring-shaped element is configured to mechanically attach the anchoring legs to a proximal tubular opening of the electrically insulating element, and wherein the second ring-shaped element is configured to mechanically attach the anchoring legs to a distal tubular opening of the electrically insulating element opposite the proximal tubular opening of the electrically insulating element.

12. The heater assembly according to claim 1, wherein the electrical resistive heater is configured surrounding a heating chamber of an associated aerosol-generating device, and wherein the heating chamber is configured for receiving the aerosol-generating article containing aerosol-forming substrate.

13. The heater assembly according to claim 12, wherein the chamfer of the anchoring legs is configured for guiding insertion of the aerosol-generating article into the heating chamber.

14. The heater assembly according to claim 1, wherein the central heating portion comprises opposing end portions, and wherein the opposing end portions are connectable so that the central heating portion has a tubular shape.

15. A method for manufacturing a heater assembly, wherein the method comprises the steps of:

i) providing an electrically insulating element, ii) providing an electrical resistive heater, the heater comprising:

a central heating portion, which is configured to be heated, electrical contacts, which contact the central heating portion and which are configured to supply electrical energy to the central heating portion, and anchoring legs, which are configured bendable, wherein the anchoring legs are arranged adjacent to the central heating portion, and wherein the anchoring legs are configured forming a chamfer for guiding insertion of an aerosol-generating article, iii) adapting the central heating portion so that the central heating portion has a tubular shape, iv) inserting the central heating portion into the electrically insulating element, and v) bending the anchoring legs outwards and at least partially around the electrically insulating element to anchor the electrical resistive heater to the electrically insulating element.

* * * * *